(12) United States Patent
Baviloliaie et al.

(10) Patent No.: US 12,331,715 B2
(45) Date of Patent: Jun. 17, 2025

(54) FIBRE-REINFORCEMENT FABRIC FOR A WIND TURBINE BLADE COMPONENT

(71) Applicant: LM WIND POWER A/S, Kolding (DK)

(72) Inventors: Mahdi Baviloliaie, Kolding (DK); Michael Scholarth Koefoed, Kolding (DK); Henrik Barslev, Kolding (DK); Jens Zangenberg Hansen, Kolding (DK)

(73) Assignee: LM WIND POWER A/S, Kolding (DK)

(*) Notice: Subject to any disclaimer, the term of this patent is extended or adjusted under 35 U.S.C. 154(b) by 0 days.

(21) Appl. No.: 18/271,126

(22) PCT Filed: Mar. 2, 2022

(86) PCT No.: PCT/EP2022/055222
§ 371 (c)(1),
(2) Date: Jul. 6, 2023

(87) PCT Pub. No.: WO2022/184753
PCT Pub. Date: Sep. 9, 2022

(65) Prior Publication Data
US 2024/0084779 A1 Mar. 14, 2024

(30) Foreign Application Priority Data
Mar. 4, 2021 (EP) .................................... 21160767
Dec. 10, 2021 (EP) .................................... 21213799

(51) Int. Cl.
*F03D 1/06* (2006.01)
*B29C 70/22* (2006.01)
(Continued)

(52) U.S. Cl.
CPC .......... *F03D 1/0681* (2023.08); *B29C 70/226* (2013.01); *B29C 70/302* (2021.05); *B29L 2031/085* (2013.01); *F05B 2280/6013* (2013.01)

(58) Field of Classification Search
CPC ... F03D 1/0681; F03D 1/0675; B29C 70/226; B29C 70/302; B29C 70/20;
(Continued)

(56) References Cited

U.S. PATENT DOCUMENTS 5,499,904 A * 3/1996 Wallace .................. F03D 3/062
416/233
2003/0176561 A1* 9/2003 Joshi .......................... C08J 3/24
524/494
(Continued)

FOREIGN PATENT DOCUMENTS

EP 0073648 B1 * 5/1988
EP 2402151 A2 1/2012
(Continued)

*Primary Examiner* — David E Sosnowski
*Assistant Examiner* — Wayne A Lambert
(74) *Attorney, Agent, or Firm* — Nath, Goldberg & Meyer; Jerald L. Meyer; Tanya E. Harkins

(57) ABSTRACT

The disclosure relates to a fibre reinforcement fabric for a wind turbine component, the fabric comprising a first plurality of fibre bundles arranged in parallel in a warp direction and stitched together, the fabric having a first outermost fibre bundle defining a first fabric edge parallel to the warp direction and a second outermost fibre bundle defining a second fabric edge opposite the first fabric edge, the fabric having a first tapered portion including the first outermost fibre bundle, wherein a thickness of the fabric in the first tapered portion is tapering from a first fabric thickness to a second fabric thickness in a direction towards the first fabric
(Continued)

edge. The disclosure also relates to a spar cap and a wind turbine blade shell part comprising such fabric or fabrics.

20 Claims, 8 Drawing Sheets

(51) Int. Cl.
  *B29C 70/30*  (2006.01)
  *B29L 31/08*  (2006.01)

(58) Field of Classification Search
  CPC ....... B29L 2031/085; F05B 2280/6013; Y02E 10/72; Y02P 70/50; B29D 99/0028
  See application file for complete search history.

(56) References Cited

U.S. PATENT DOCUMENTS

| | | | | |
|---|---|---|---|---|
| 2004/0113317 | A1* | 6/2004 | Healey | D04H 3/115 |
| | | | | 264/324 |
| 2008/0145615 | A1* | 6/2008 | Jacobsen | B32B 3/02 |
| | | | | 83/869 |
| 2010/0062238 | A1* | 3/2010 | Doyle | B29C 70/02 |
| | | | | 416/223 R |
| 2010/0098549 | A1* | 4/2010 | Mironov | B29D 99/0028 |
| | | | | 156/245 |
| 2011/0084496 | A1* | 4/2011 | Kuroiwa | B29C 70/443 |
| | | | | 290/55 |
| 2011/0135485 | A1* | 6/2011 | Wang | B29C 70/521 |
| | | | | 29/889.71 |
| 2011/0135486 | A1* | 6/2011 | Bendel | F03D 1/065 |
| | | | | 428/114 |
| 2011/0143081 | A1* | 6/2011 | Fritz | B29C 70/302 |
| | | | | 428/77 |
| 2011/0171038 | A1* | 7/2011 | Esaki | F03D 1/0675 |
| | | | | 156/213 |
| 2011/0243750 | A1* | 10/2011 | Gruhn | F03D 1/0675 |
| | | | | 416/226 |
| 2012/0027609 | A1* | 2/2012 | Ogde | B29C 70/545 |
| | | | | 29/889.71 |
| 2013/0287589 | A1* | 10/2013 | Adamse | B29D 99/0025 |
| | | | | 428/221 |
| 2013/0333823 | A1* | 12/2013 | Hedges | B29C 70/342 |
| | | | | 156/305 |
| 2014/0234114 | A1* | 8/2014 | Schibsbye | F03D 1/0675 |
| | | | | 416/226 |
| 2015/0017853 | A1* | 1/2015 | Perillat-Collomb | B29C 70/44 |
| | | | | 428/221 |
| 2015/0151390 | A1 | 6/2015 | Upton et al. | |
| 2016/0047252 | A1* | 2/2016 | Merzhaeuser | B29C 70/023 |
| | | | | 156/247 |
| 2016/0146185 | A1* | 5/2016 | Yarbrough | B32B 5/22 |
| | | | | 156/242 |
| 2016/0221272 | A1 | 8/2016 | Koefoed, et al. | |
| 2016/0273516 | A1* | 9/2016 | Smith | B29C 70/521 |
| 2016/0318261 | A1* | 11/2016 | Storer | B29C 70/083 |
| 2017/0030330 | A1 | 2/2017 | Caruso et al. | |
| 2018/0355096 | A1* | 12/2018 | Corley | C08G 59/02 |
| 2018/0372066 | A1* | 12/2018 | Livingston | F03D 1/0675 |
| 2019/0263096 | A1* | 8/2019 | Baertl | B32B 27/32 |

FOREIGN PATENT DOCUMENTS

| | | | | |
|---|---|---|---|---|
| EP | 2402151 | A3 | 7/2013 | |
| EP | 2716434 | A1 * | 4/2014 | ............ B29C 70/20 |
| JP | 2002317371 | A * | 10/2002 | |
| TW | 546431 | B * | 8/2003 | |
| WO | WO-2010040576 | A1 * | 4/2010 | .......... B28B 11/242 |
| WO | WO-2015113571 | A1 * | 8/2015 | .......... B29B 13/023 |

\* cited by examiner

FIBRE-REINFORCEMENT FABRIC FOR A WIND TURBINE BLADE COMPONENT

This is a National Phase Application filed under 35 U.S.C. 371 as a national stage of PCT/EP2022/055222, filed Mar. 2, 2022, an application claiming the benefit of European Patent Application No. 21160767.6, filed Mar. 4, 2021, and also claiming the benefit of European Patent Application No. 21213799.6, filed Dec. 10, 2021, the content of each of which is hereby incorporated by reference in its entirety.

FIELD OF THE INVENTION

The present invention relates to a fibre-reinforcement fabric for a wind turbine blade component, a spar cap, and a wind turbine blade shell part.

BACKGROUND OF THE INVENTION

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load-bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and a trailing edge of the shell parts. This design has the advantage that the critical load-carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load-carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre-reinforced matrix material.

During the process of filling the mould, a vacuum, said vacuum in this connection being understood as an under-pressure or negative pressure, is generated via vacuum outlets in the mould cavity, whereby liquid polymer is drawn into the mould cavity via the inlet channels in order to fill said mould cavity. From the inlet channels, the polymer disperses in all directions in the mould cavity due to the negative pressure and inter alia towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus, dry spots are areas where the fibre material is not impregnated, and where there can be air pockets, which are difficult or impossible to remove by controlling the vacuum pressure and a possible overpressure at the inlet side. In vacuum infusion techniques, employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases, the polymer or resin applied is polyester, vinyl ester or epoxy, but may also be PUR or pDCPD, and the fibre reinforcement is most often based on glass fibres or carbon fibres or even hybrids thereof. Epoxies have advantages with respect to various properties, such as shrinkage during curing (which in some circumstances may lead to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre reinforcement material is arranged in the mould. Thus, various post-moulding operations, such as painting the blade, may be avoided. Further, polyesters and vinyl esters are cheaper than epoxies and further do not require external equipment to cure the resin. Consequently, the manufacturing process may be simplified, and costs may be lowered.

Often the composite structures comprise a core material covered with a fibre-reinforced material, such as one or more fibre-reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM, the liquid resin is not drawn into the mould cavity due to a vacuum generated in the mould cavity. Instead, the liquid resin is forced into the mould cavity via an overpressure at the inlet side.

Prepreg moulding is a method in which reinforcement fibres are pre-impregnated with a pre-catalysed resin. The resin is typically solid or near-solid at room temperature.

The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material needs to be made of a material which is able to withstand the process temperatures needed for bringing the resin to reflow. Prepreg moulding may be used both in connection with an RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

As, for instance, blades for wind turbines have become longer and larger in the course of time and may now be more than 100 meters long, the impregnation time in connection with manufacturing such blades has increased, because more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result, the polymer has to stay liquid for a longer time, normally also resulting in an increase in the curing time.

As described above in relation to the second design, the spar caps or main laminates comprise a high number of fibre layers compared to the remainder of the blade and may form a local thickening of the wind turbine shell, at least with respect to the number of fibre layers. This typically results in a tapering of the shell thickness from the spar cap region to the adjacent parts of the shell, where the number of layers is lower.

Tapering of the thickness of fibre-reinforced components is known to be challenging. Tapering involves ply drop, where one or more plies are terminated (dropped) in order to reduce the number of layers and accordingly the thickness. Ply drop is known to be a cause of delamination of the layers. This has been mitigated by applying a cover layer that covers the terminated plies. However, the process is tedious. Dropping layers requires arranging the individual layers with even higher precision, typically manually, since the termination of the ply to be dropped must take place with consistency and precision. Ply drops leave air pockets between the cover layers and the terminated layers. The higher the positioning of the ply terminations, the smaller the air pockets.

SUMMARY OF THE INVENTION

It is an object of the present invention to mitigate one or more of the issues described above concerning tapered wind turbine components such as spar caps for wind turbine blade shells.

In a first aspect, the invention provides a fibre reinforcement fabric for a wind turbine component, the fabric comprising a first plurality of fibre bundles arranged in parallel in a warp direction and stitched together, the fabric having a first outermost fibre bundle defining a first fabric edge parallel to the warp direction and a second outermost fibre bundle defining a second fabric edge opposite the first fabric edge, the fabric having a first tapered portion including the first outermost fibre bundle, wherein a thickness of the fabric in the first tapered portion is tapering from a first fabric thickness to a second fabric thickness in a direction towards the first fabric edge.

Such a fabric mitigates some of the issues related to ply-drop in a tapered fibre-reinforced composite component. As described in more detail in relation to the drawings below, ply drop inevitably leads to weaknesses due to lack of reinforcing fibre material. Accordingly, a fabric or mat is provided that is configured with an inherent tapering towards the sides/edges of the fabric (such as a "mat"). The tapering is provided by the configuration of the fibre bundles and/or the arrangement of fibre bundles changing towards the first fabric edge so as to provide the tapering to a smaller thickness (the second thickness) towards the first fabric edge.

The first plurality of fibre bundles consists of dry fibres. That is, the fibre bundles have not been impregnated with a resin. As a result, the tapered fabric is still pliable both in the warp direction and in the direction from the first fabric edge to the second fabric edge, similar to a textile fabric. This allows personnel to easily drape the fabric in the desired shape, flat or curved. The use of dry fibres also allows the fibre bundles to be easily stitched together, as the stitching needle can easily penetrate either through individual fibre bundles or between adjacent fibre bundles. This also means that the stitches can be provided in the exact pattern desired. Thus, in some embodiments, the first plurality of fibre bundles is stitched together at least via stitches going through one or more individual fibre bundles in the first plurality of fibre bundles.

The weight of the fabric is also lower compared to a combination of fabric and resin, which is another advantage both for transport purposes and for laying up fibre material.

Furthermore, dry fibre bundles can change shape when subjected to pressure, for instance during resin infusion, which results in a stronger composite.

In some embodiments, the first plurality of fibre bundles is stitched together with one or more fibre bundles impregnated with resin. In some cases, this can reduce the risk of dry spots remaining even after resin infusion. Such embodiments are particularly useful for wind turbine components in which part of the component is flat and a neighbouring part needs the drapability provided by the first plurality of fibre bundles.

In some embodiments, the first plurality of fibre bundles comprises a second plurality of fibre bundles arranged in a first layer and a third plurality of fibre bundles arranged in a second layer on the first layer, wherein the second layer is terminated before the first fabric edge. Stitching together multiple layers in a single fabric but terminating one of the layers before terminating the other layer (which then defines the edge of the fabric) provides a robust fabric that is easier to manage. Layer termination is currently done manually, which means arranging a known fabric to terminate at the desired point. This is prone to imprecision, and it is time consuming to arrange the terminating layer precisely to meet tolerances.

In some embodiments, the first tapered portion comprises one or more fibre bundles having a first cross-sectional area and one or more fibre bundles having a second cross-sectional area smaller than the first cross-sectional area, arranged such as to provide the tapering of the thickness in the first tapered portion. Using fibre bundles with different cross-sectional areas can further mitigate the issues discussed above, as it provides the possibility to taper the thickness of the fabric more gradually. A ratio between the second cross-sectional area and the first cross-sectional area is preferably at most 95%, such as at most 90%, such as at most 80%, such as in the range 20% to 80%, such as in the range 50% to 80%. In some embodiments, the tapered portion comprises at least two bundles for which the ratio is 50%, such as a fibre bundle with 2400 tex and a fibre bundle with 4800 tex. Other values can be chosen that give the same ratio. In some embodiments, the tapered portion comprises at least two bundles for which the ratio is 75%, such as a fibre bundle with 3600 tex and a fibre bundle with 4800 tex.

In some embodiments, the tapered portion comprises at least a fibre bundle with 2400 tex, a fibre bundle with 3600 tex and a fibre bundle with 2400 tex.

In some embodiments, the tapering is provided by a combination of terminating a layer and providing one or more fibre bundles having a first cross-sectional area and one or more fibre bundles having a second cross-sectional area smaller than the first cross-sectional area. This provides further granularity in tapering the thickness of a fabric.

In some embodiments, the fabric has a second tapered portion including the second outermost fibre bundle, and a thickness of the fabric in the second tapered portion is tapering from a third fabric thickness to a fourth fabric thickness in a direction towards the second fabric edge. In some embodiments, the fourth fabric thickness is equal to the second fabric thickness. In other words, the edges of the fabric have the same thickness. In some embodiments, the tapering in the second tapered portion towards the second fabric edge is identical to the tapering in the first tapered section towards the first fabric edge. This is typically used to provide a symmetric shape, although in some embodiments the tapering at the two edges is similar only near the edges. Such fabrics can provide a more advanced tapering. However, in some embodiments, the fabric has a reflectional symmetry seen in a direction along the warp direction. Thus, the thickness behaves identically towards the two edges from a central point in a weft direction. In some embodiments, a thickness across the fabric in the weft direction is uniform and has a constant thickness across at least 90%, such as across at least 95% of a width of the fabric, the width being the distance between the first fabric edge and the second fabric edge. In some embodiments, the tapering towards one or both edges occurs over a weft-wise distance of at least 2 mm, such as in the range 2-30 mm, such as in the range 3-30 mm. This depends in part on the fibre bundle size, but such tapering distance can significantly mitigate ply drop issues. In some embodiments, the tapering occurs over a distance of at least 5 mm, such as at least 10 mm. In some embodiments, the width is in the range 10-300 cm, such as in the range 10-240 cm, such as in the range 10-50 cm.

In some embodiments, the fabric comprises three or more layers. A fabric with three layers simplifies the layup process significantly.

In some embodiments, the fabric has a rotational symmetry seen in a direction along the warp direction.

In some embodiments, the first plurality of fibre bundles comprises a plurality of glass fibre rovings, i.e. bundles of glass filaments.

In some embodiments, the first plurality of fibre bundles consists of a plurality of glass fibre rovings, i.e. bundles of glass filaments.

In some embodiments, the first plurality of fibre bundles comprises carbon fibre tows, i.e. bundles of carbon filaments.

In some embodiments, the first plurality of fibre bundles consists of carbon fibre tows, i.e. bundles of carbon filaments.

Glass fibre bundles and carbon fibre tows can also be included in the same fabric.

In some embodiments, some or all of the first plurality of fibre bundles have a tex value in the range 300-4800, such as in the range 1200-3200, such as in the range 2400-3200.

A second aspect of the invention provides a spar cap for a wind turbine blade. The spar cap comprises one or more fibre fabrics. For instance, the spar cap comprises a plurality of fibre layers including at least one fabric in accordance with an embodiment of the first aspect of the invention.

A third aspect of the invention provides a wind turbine blade comprising one or more fibre fabrics in accordance with an embodiment of the first aspect of the invention. In some embodiments, the wind turbine blade comprises a spar cap in accordance with an embodiment of the second aspect of the invention.

A fourth aspect of the invention provides a method of laying up fibre material in a mould for manufacturing a wind turbine blade shell part. The method comprises:
 laying up fibre material to form an outer skin of the shell part,
 laying up a plurality of fibre layers to form a spar cap fibre layup, the plurality of fibre layers comprising one or more fabrics in accordance with an embodiment of the first aspect of the invention.

In some embodiments, the method further comprises arranging a vacuum bag on the mould and evacuating air from the laid up material, and infusing resin in between individual fibres in one or more of the first plurality of fibre bundles, such as in every fibre bundle of the first plurality of fibre bundles, and curing the resin. The fabric that was pliable before infusion now forms part of a high-strength fibre-reinforced composite component.

In some embodiments, an ambient temperature at the mould during laying up of the first plurality of fibre layers and/or a maximum temperature of the layup surface of the mould during laying up of the first plurality of fibre layers do not exceed 50 degrees Celsius.

In some embodiments, the maximum temperature of the layup surface of the mould during laying up of the first plurality of fibre layers does not exceed 50 degrees Celsius independent of the ambient temperature at the mould.

This prevents premanufactured fibre-reinforced composite parts or fabrics impregnated with resin from expanding or contracting or shifting significantly in the mould relative to dry fibre before resin infusion. A stronger fibre-reinforced wind turbine blade shell part is thereby obtained.

BRIEF DESCRIPTION OF THE DRAWINGS

The invention is explained in detail below with reference to the embodiments shown in the drawings.

DETAILED DESCRIPTION OF SELECTED EMBODIMENTS

Figure 1:
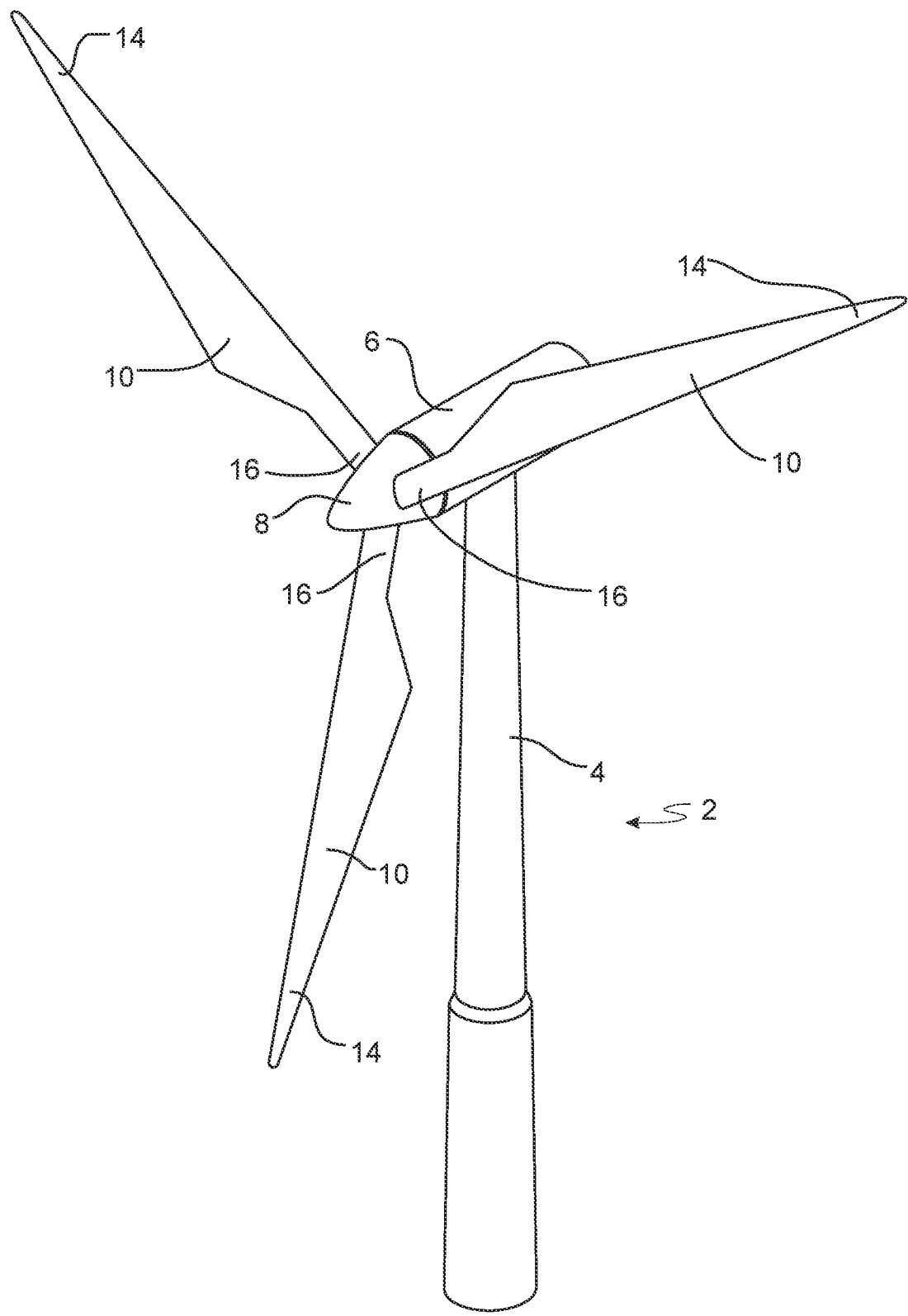
FIG. 1 illustrates a wind turbine.

Embodiments of the invention will be described in more detail in the following with reference to the accompanying drawings. Like reference numerals may refer to like elements throughout. The drawings show selected ways of implementing the present invention and are not to be construed as being limiting.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
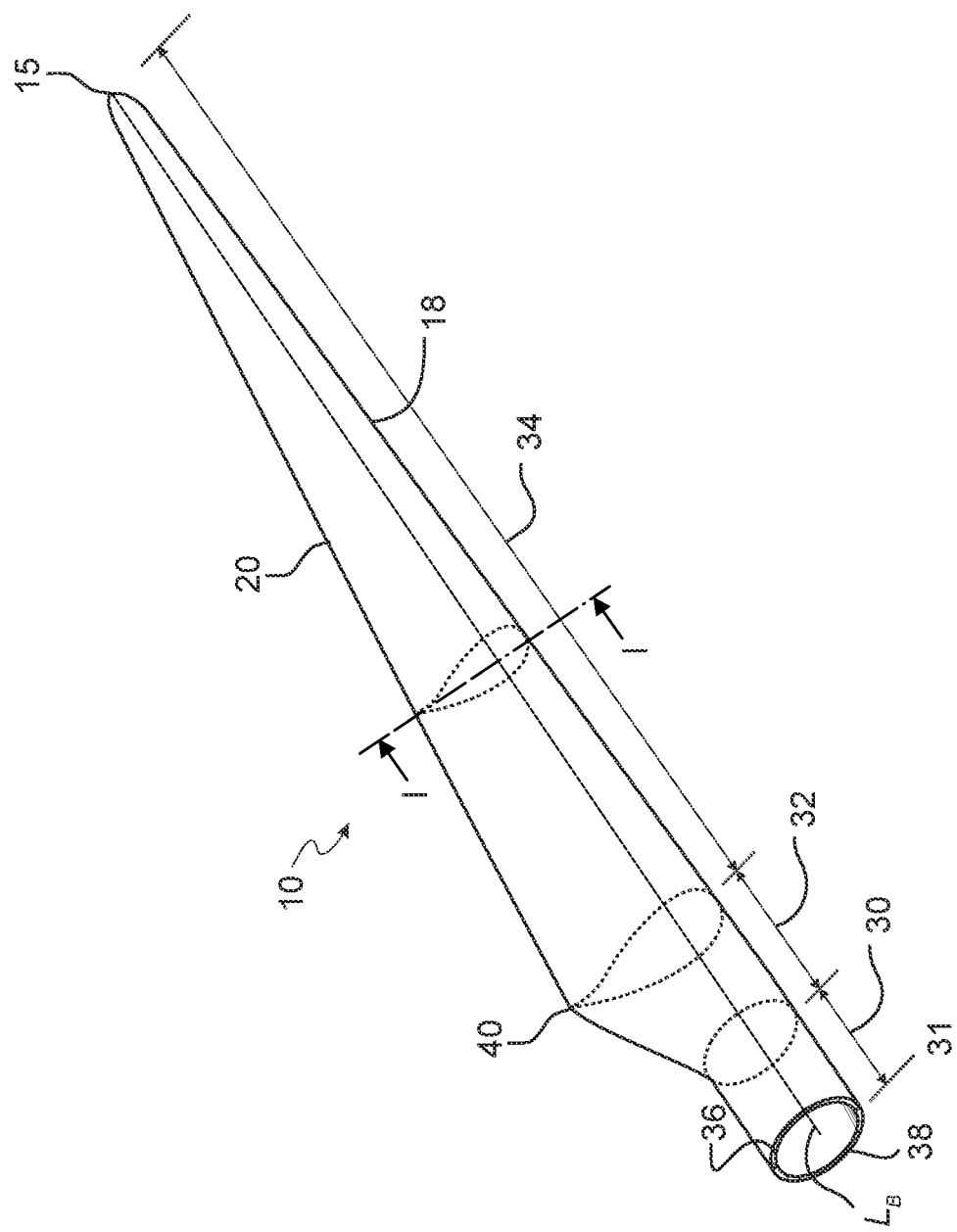
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15, opposite the root end 31 that attaches to the wind turbine hub 8.

The airfoil region 34 (also called the profiled region) of the wind turbine has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance from the hub.

A shoulder 40 of the blade 10 is defined as the position where the blade 10 has its largest chord length. The shoulder 40 is typically provided at the boundary between the transition region 32 and the airfoil region 34. FIG. 2 also illustrates the longitudinal extent $L_B$ and also represents the longitudinal axis of the blade.

The blade is typically made from a pressure side shell part 36 and a suction side shell part 38 that are glued to each other along bond lines at the leading edge 18 and the trailing edge 20 of the blade 10.

Figure 3:
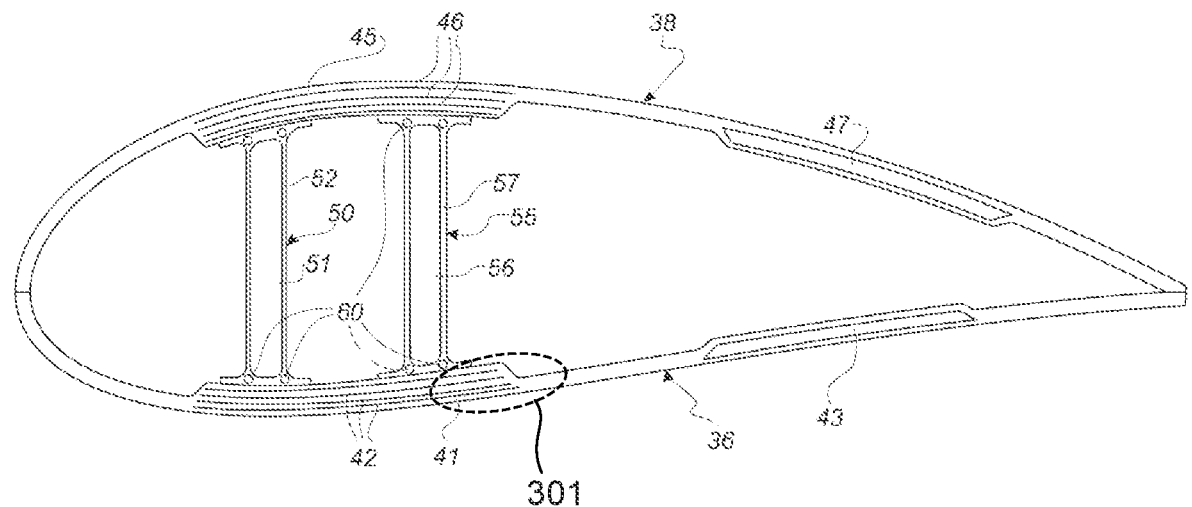
FIG. 3 shows a schematic view of a cross-section of a wind turbine blade.

FIG. 3 shows a schematic view of a cross-section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load-bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres may be arranged at these joint areas. Further, such ropes 60 will also facilitate transferring loads from the skin layers of the shear web body to the flanges. However, according to the invention, alternative constructional designs are possible.

The blade shells 36, 38 may comprise further fibre reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

The indicated portion 301 illustrates a portion of the spar cap 41 at a transition from the thicker spar cap 41 to a thinner portion of the shell 36 not reinforced with a spar cap.

Figure 4:
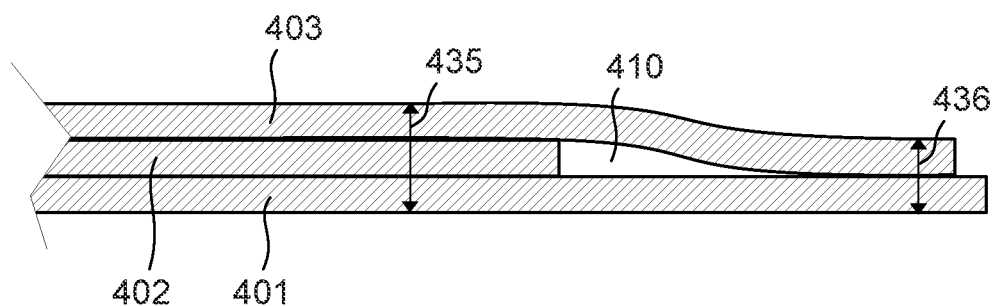
FIG. 4 shows a schematic detailed view of a tapered spar cap portion in a wind turbine blade shell.

FIG. 4 schematically illustrates a ply-drop in a three-layer layup in the portion 301. The drop of a ply results in a reduction in the thickness towards the right side of the portion 301. Fabric 401 represents an outermost layer. Fabric 402 is a middle layer that is terminated. Fabric 403 is an innermost layer that covers fabric 402 (at least in portion 301) and part of fabric 401 (at least in portion 301). Even though it provides the desired reduction of thickness in the component from a first thickness 435 to a second thickness 436, the termination (drop) of the fabric 402 leaves behind a cavity 410 free of fibre material that fabric 403 is not able to fill. Such a cavity may at best be filled with resin during infusion of resin; at worst, an air pocket within the infused component is left behind that will have to be manually repaired by filling it with resin after curing. In either case, the portion 301 will have a lower strength than the surrounding portions.

Figure 5:
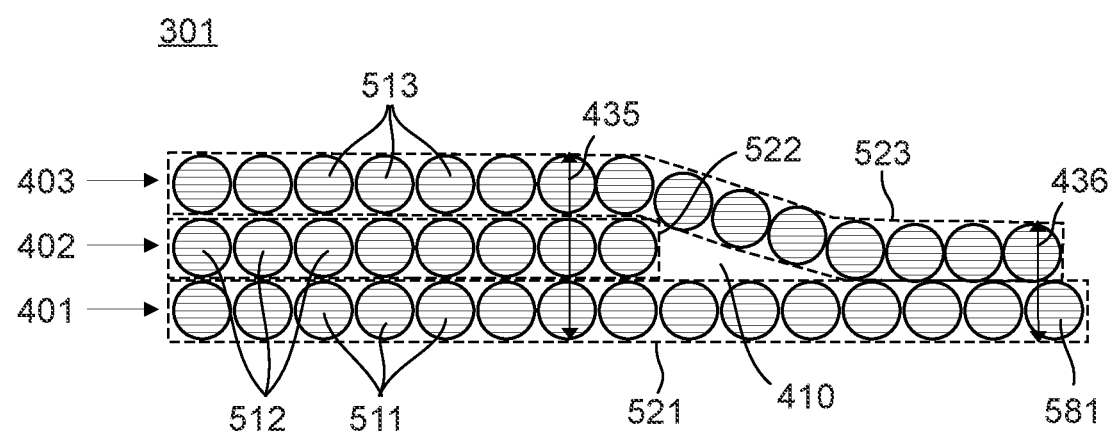
FIG. 5 shows a schematic detailed view of a tapered spar cap portion in a wind turbine blade shell.

FIG. 5 schematically illustrates the same portion 301, but with fibre bundles. Fabric 401 comprises bundles 511 stitched together as represented by stitched line 521. A real stitching extends vertically in between or through individual bundles 511, but these are left out to increase the visibility of the features. Fabric 402 comprises individual bundles 512 stitched together by stitching 522. Fabric 403 comprises individual bundles 513 stitched together by stitching 523. Each fabric is a unidirectional fibre fabric, the bundles of which extend along the longitudinal axis of the spar cap 41 (FIG. 3). It is noted that in an actual layup, the bundles 511, 512, 513 may have an oval shape, even before being pressed together by a vacuum. For simplicity, they are illustrated with a circular cross-section.

In case fabrics of the same type is used for the different layers 401, 402, 403, the cross-sectional area of the rovings 511, 512, and 513 will be identical, being the same type of rovings.

Figure 6:
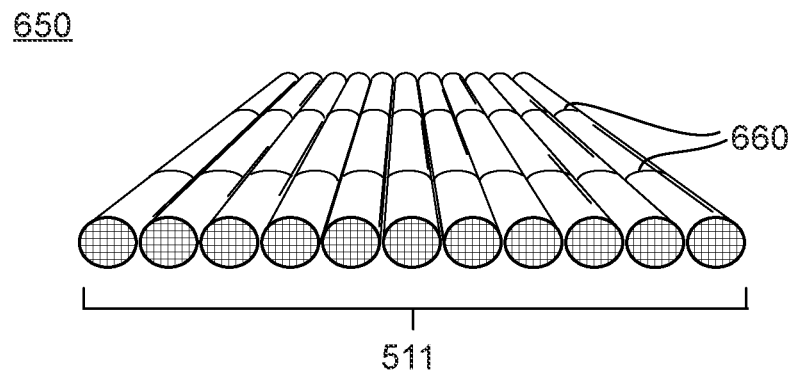
FIG. 6 schematically shows a perspective view of a unidirectional fabric.

A unidirectional fabric 650 is illustrated in a perspective view in FIG. 6. Fibre bundles 511 like those in FIG. 5 are held together in the fabric by stitchings 660. The fibre bundles 511 are typically referred to as rovings or tows. Sometimes, the term roving is used to refer to glass bundles and tow is used to refer to carbon bundles. For simplicity, the term roving will be used in the remainder of the description to refer to any kind of fibre filament bundle. The filaments may for instance be made of glass filaments or carbon filaments or a combination. Other materials can be used, such as polyester.

In some cases, a unidirectional fabric will have a backing layer that modifies the properties. For simplicity, such a backing layer is not included in the drawings.

Figure 7:
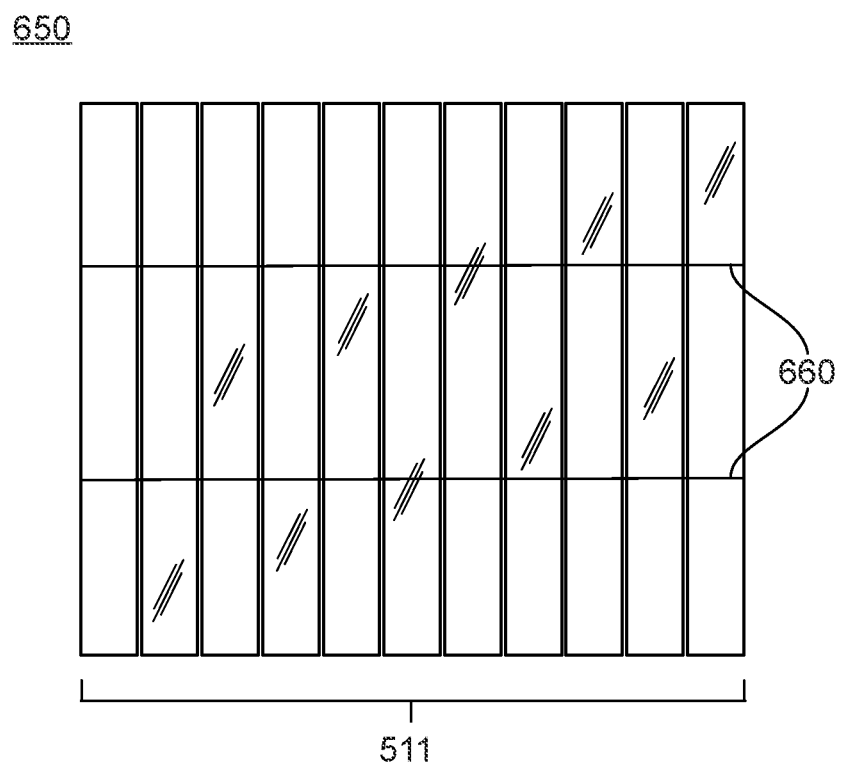
FIG. 7 schematically shows a unidirectional fabric seen from the top.

FIG. 7 illustrates the unidirectional fabric seen in a top view, also schematically showing the stitching 660 holding the rovings together. Usually, the stitching is more complex in order to give the fabric certain mechanical properties and to hold the backing layer in place.

Figure 8:
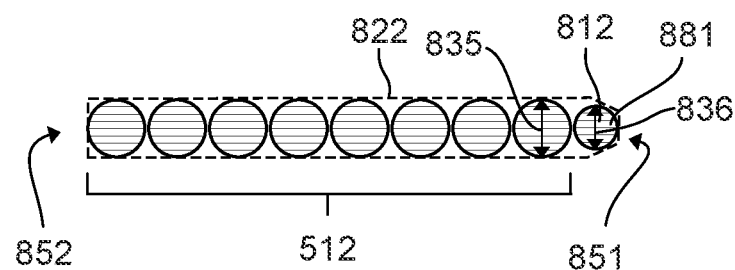
FIG. 8 shows a schematic view of a fibre fabric in accordance with an embodiment of the invention.

FIG. 8 illustrates an embodiment of a fabric 802 in accordance with the invention. The fabric 802 comprises rovings 512 similar to those shown in FIG. 5 as part of known fabric 401. However, a smaller, but in this embodiment crucial, roving 812 at a first fabric edge 851 of the fabric 802 has a smaller cross-section. Roving 812 is the outermost roving (fibre bundle) 881 that defines the first fabric edge 851. Stitching 822 holds the rovings 512 and 812 together as a single, individual fabric that can be manufactured, handled, and laid up individually as part of a fibre layup for a fibre-reinforced composite component, such as a spar cap in particular or another composite element in general.

Roving 812 is at the same time the outermost roving that defines the first fabric edge.

The second fabric edge 852 of the fabric 802 opposite the first fabric edge 851 is illustrated as having the same thickness as rovings 512 to illustrate that fabrics can be tailored at one edge only, if so needed. An example below illustrates tailoring at both edges.

The fabric 802 can be manufactured similarly to known unidirectional fabrics. However, instead of using rovings having the same cross-section, rovings with smaller cross-sections are provided where the thickness is to be different, such as towards the first fabric edge 851. Known stitching methods can be used when stitching together the rovings 512 and smaller roving 812 of different sizes. The illustration of the stitching is schematic. Stitching is usually an elastic material that will adapt its shape to the rovings, once stitched through or between rovings.

Figure 9:
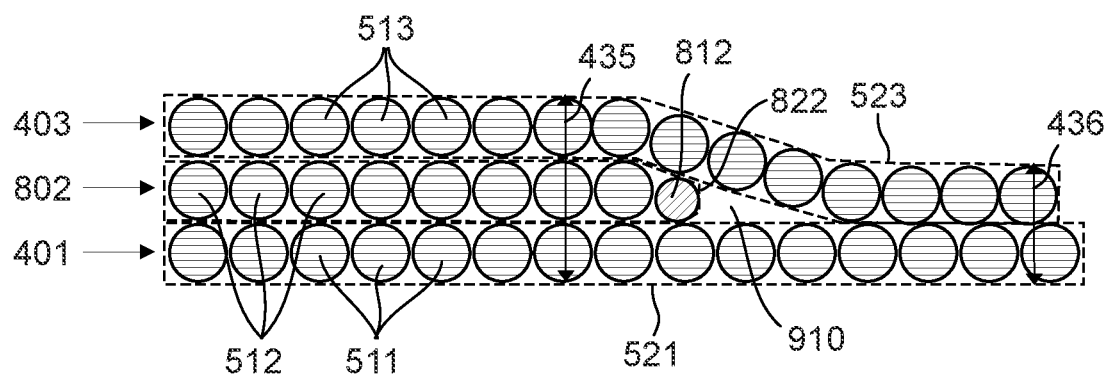
FIG. 9 shows a schematic view of part of a spar cap including a fibre fabric in accordance with an embodiment of the invention.

FIG. 9 illustrates a spar cap portion 901 that results instead of the portion 301 shown in FIG. 5 when using fabric 802 instead of the fabric of fabric 402 as in FIG. 5. The outer layer is made of the same fabric 401 as the layup in FIG. 5 and the innermost layer is made of the same fabric 403 as the layup in FIG. 5. As seen from FIG. 9, the smaller roving 812 having a smaller cross-section causes a reduction of the size of the cavity when a ply is dropped. As seen when comparing FIG. 9 to FIG. 5, the size of the resulting cavity 910 is smaller than the size of the cavity 410 when using known fabric 402. However, the same thickness reduction is achieved, going from the first thickness 435 down to the second thickness 436. However, the cavity 910 that causes a degree of weakness is smaller, and that translates into a resulting strength of the component that is higher compared to the layup shown in FIG. 5.

The embodiment 802 in FIG. 8, used to form the spar cap portion 901 in FIG. 9, mitigates the effect of dropping a ply, but the issue of aligning the termination (the edge) of the ply to-be-dropped is unmitigated.

Figure 10:
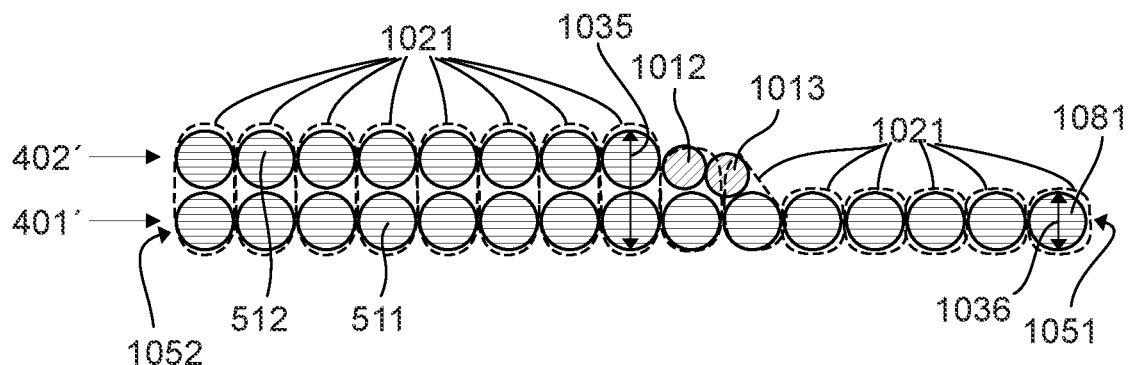
FIG. 10 shows a schematic view of a fibre fabric in accordance with an embodiment of the invention.

FIG. 10 illustrates a further embodiment of a fabric 1002 in accordance with an embodiment of the invention. The fabric 1002 comprises an array of rovings 511 forming a first layer 401' similar to the individual fabric 401 shown in FIG. 5. In addition, an array of further rovings 512 forms a second layer 402' similar to the individual fabric 402 shown in FIG. 5. In fabric 1002, all rovings are stitched together in a single stitching 1021. More than a single stitching may be used.

In this example, rovings 511 are identical to rovings 512 because the purpose of fabric 1002 in this illustration is to mimic, to a certain extent, the known fabrics 401 and 402 shown in FIG. 5, while at the same time mitigating the ply-drop issues related to use of known fabrics such as 401 and 402.

As seen from FIG. 10, a tapering is obtained in part by terminating the second layer 402' before the first fabric edge 1051, which edge is therefore defined by an outermost roving 1081 in the first layer 401'.

To further refine the tapering, two smaller rovings 1012 and 1013 similar to smaller roving 812 in FIG. 8 are part of the fabric 1002 and, importantly, are stitched into the fabric as part of the single fabric. In this example, the rovings towards the first fabric edge 1051 of the fabric 1002 have the same thickness as those in FIG. 5, thereby mimicking the fabric 401 shown in FIG. 5.

For simplicity, the stitchings have been generally shown as surrounding the fibre bundles in the drawings. However, stitchings may also pass through one or more of the fibre bundles, as shown in roving 1013 in FIG. 10. This is possible because the fibre bundles are not solidified. This makes the stitching process simpler.

The second fabric edge 1052 is formed, for the purpose of the example only, by rovings in both layers, in this case left-most rovings of type 511 and 512 identical to those used in the fabrics 401 and 402 shown in FIG. 5. However, in the fabric 1002, they are instead stitched together into an individual fabric that can be handled and used independently as a single unit. As a result of the combination of multiple layers, a tapering of the fabric 1002 is achieved towards the first fabric edge 1051. Further, the rovings 1012 and 1013, having a smaller cross-section, contribute to the tapering towards the first fabric edge 1051. Finally, as seen in FIG. 10, the top layer 402' ends before the first fabric edge 1051, which results in a further tapering of the fabric as it is only made up of a single layer of rovings near the first fabric edge 1051.

Figure 11:
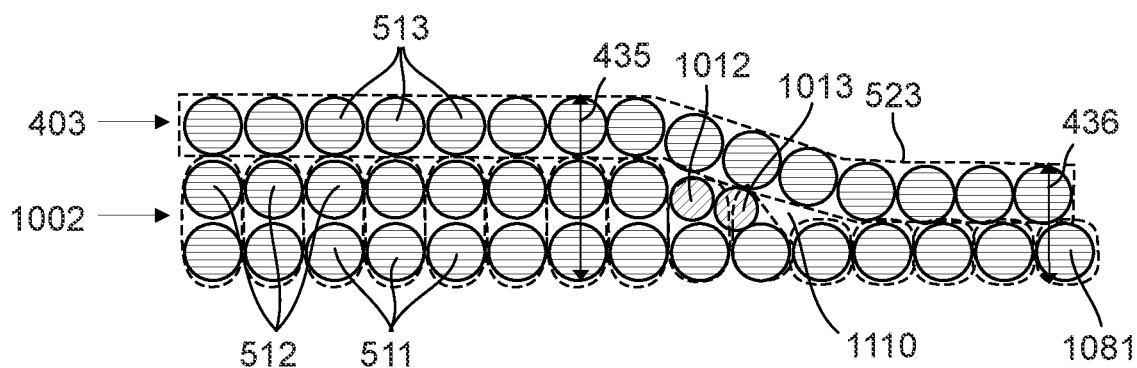
FIG. 11 shows a schematic view of part of a spar cap including a fibre fabric in accordance with an embodiment of the invention.

FIG. 11 illustrates a spar cap portion 1101 that results when fabric 1002 is used instead of the two fabrics 401 and 402 as in FIG. 5 or even the improved fabric 802 is used instead of fabric 402, as shown in FIG. 9. The fabric 1002 from FIG. 10 takes the place of two known layers, such as fabrics 401 and 402 in FIG. 5, or the place of the fabrics 401 together with the improved fabric embodiment 802 used in the spar cap portion 901 shown in FIG. 9. Thus, in effect, when laying up the structure corresponding to section 301 shown in FIG. 3, only two fabrics are used: the fabric 1002 in accordance with an embodiment of the invention and the fabric 403 also used in the example in FIG. 4, where it illustrates the problem associated with ply drop.

By tailoring the fabric in the way illustrated by fabric 1002 in FIG. 10, fewer layers must be handled, which in turn simplifies the layup process.

Furthermore, as shown in FIG. 11, the cavity 1110 resulting when fabric 1002 is used together with fabric 403 is further reduced compared to using the already-improved fabric 802 shown in FIGS. 8-9. Again, a tapering from a first thickness 435 down to a second thickness 436 is achieved, but the cavity 1110 that causes weakness is smaller compared to the cavities shown in FIGS. 5 and 9, and this translates into a higher strength of the resulting component compared to the spar cap portion in FIG. 9 and into an even higher strength than the spar cap portion in FIG. 5 having a cavity resulting from termination of a known uniform unidirectional fabric 402.

Figure 12:
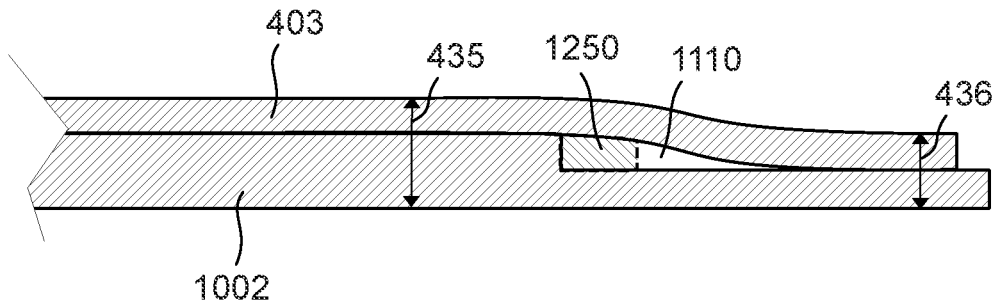
FIG. 12 shows a schematic view of part of a spar cap including a fibre fabric in accordance with an embodiment of the invention.

FIG. 12 illustrates the spar cap portion 1101 in the same way that FIG. 4 illustrates the section 301 obtained without a tapered fabric. As can be seen from FIG. 12, the single fabric 1002 replaces the two fabrics 401 and 402. Fabric 403 is still used as a cover layer. In FIG. 12, the additional portion 1250 schematically illustrates a portion that rovings 1012 and 1013 add in the spar cap portion, whereby the resulting cavity 1110 is smaller than can be obtained with a known uniform unidirectional fabric such as fabric 402 in FIG. 4.

In a further embodiment, known fabric 403 is stitched together with the rovings of fabric 1002, preferably in a single stitching, i.e. not by stitching fabric 403 together with fabric 1002, but by stitching together all the rovings of fabric 403 and fabric 1002 in one stitching process. However, further stitching can be used. In both cases, the end result is a single fabric that can be manufactured and handled individually, further simplifying layup and mitigating the issues associated with cavities resulting from ply drop of known fabrics.

Figure 13:
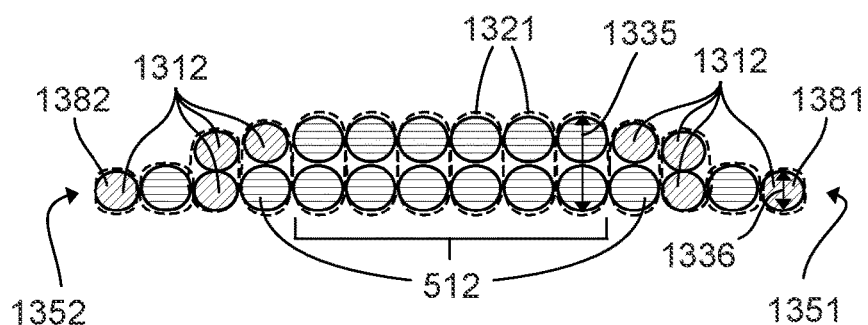
FIG. 13 shows a schematic view of a fibre fabric in accordance with an embodiment of the invention.

FIG. 13 illustrates another fabric 1302 in accordance with an embodiment of the invention. In this embodiment, the tapering is towards both edges 1351 and 1352 of the fabric.

The tapering in the fabric 1302 in FIG. 13 is more advanced than in fabrics 802 and 1002 shown in FIGS. 8 and 10. Tapering is achieved by a combination of tapering the number of layers and using rovings with different sizes, illustrated by rovings 1312 and 512. For this example, rovings 1312 are shown as identical to rovings 802, 1012, and 1013 from FIGS. 8 and 10. The rovings may have been stitched together in a single stitching, or more.

As seen in FIG. 13, the use of only two different roving sizes can create a relatively smooth tapering of the thickness. Towards the middle of the fabric, the thickness is provided by two layers of rovings of the type 512. In the direction towards the edges 1351 and 1352, tapering is provided by using a smaller roving 1312 together with a larger roving 512; then two smaller rovings 1312; then a single larger roving 512; and finally, a single smaller roving 1312. An outermost roving 1381 defines the first fabric edge, and a second outermost roving 1382 defines the second fabric edge opposite the first fabric edge. The thickness of the fabric is constant in a central weft-wise portion and tapers from a first thickness 1335 to a second thickness 1336 towards both the first fabric edge 1351 and towards the second fabric edge 1352. The tapering is the same in both directions and is obtained using the same arrangement of rovings seen in an outward direction from the weft-wise centre of the fabric. The fabric 1302 is therefore symmetric seen along the warp direction (as in the figure).

More elaborate fabrics can be made. For instance, additional roving sizes can be used and/or smaller rovings in larger numbers could be used to provide an even smoother tapering.

Figure 14:
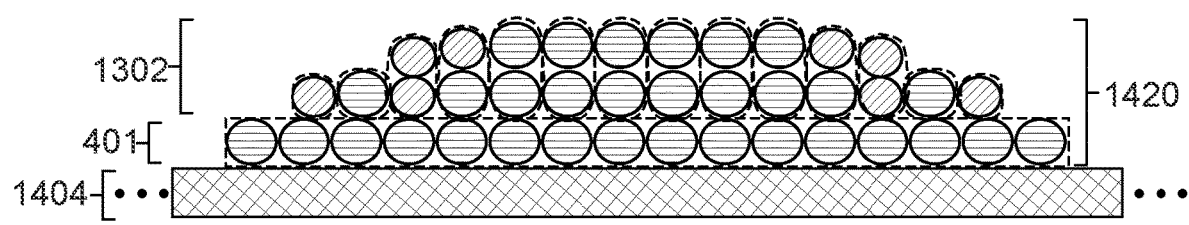
FIG. 14 shows a schematic view of part of a spar cap including a fibre fabric in accordance with an embodiment of the invention.

FIG. 14 illustrates use of the fabric 1302 for manufacturing a spar cap 1420 in combination with outer skin layers 1404. The outer skin layers 1404 typically comprise multiple fibre fabric layers of various directionality. These are shown as a single element. Similarly, spar caps may comprise fibre material with different directionalities, including unidirectional fibre fabrics. For simplicity, the example in FIG. 14 illustrates unidirectional fabric only in the spar cap 1420. Spar caps typically comprise many layers, not just three as shown in FIG. 14, but for simplicity, the example illustrates three layers.

The spar cap 1420 is made up of a known unidirectional fabric 401 such as the fabric 401 in FIG. 5, made of uniform rovings, and the fabric 1302 in accordance with the embodiment shown in FIG. 13. Fabric 401 is placed on the outer skin layers 1404, and fabric 1302 is placed onto the fabric 401. This results in a three-layer structure 1420 that tapers smoothly towards the sides, forming a smooth termination of the spar cap towards the outer skin layers 1404.

Spar cap layers 401 and 1302 could also be made as a single fabric and applied as a single fabric, as described above.

LIST OF REFERENCES

2 wind turbine
4 tower
6 nacelle
8 hub
10 blade
14 blade tip
15 tip end
16 blade root
18 leading edge
20 trailing edge
30 root region 31 root end
32 transition region
34 airfoil region
36 pressure side shell part
38 suction side shell part
40 shoulder
41 load-carrying structure/spar cap
42 fibre reinforcement layers
43 sandwich core material
45 load-carrying structure/spar cap
46 fibre reinforcement layers
47 sandwich core material
50 first shear web
51 sandwich core material
52 skin layers
55 second shear web
56 sandwich core material
57 skin layers
60 filler robes
301 spar cap portion
401, 402, 403 fabric
401', 402' fabric layer
410 cavity
435 first thickness of component
436 second thickness of component
511, 512, 513 rovings
521, 522, 523 fabric stitching
581 first outermost fibre bundle
650 unidirectional fabric
660 stitching in unidirectional fabric
802 fabric
812 smaller roving, first outermost fibre bundle
822 fabric stitching
835 first fabric thickness
836 second fabric thickness
851 first fabric edge
852 second fabric edge
881 first outermost fibre bundle
901 spar cap portion
910 cavity
1002 fabric
1012, 1013 smaller rovings
1021 stitching
1035 first fabric thickness
1036 second fabric thickness
1051 first fabric edge
1052 second fabric edge
1081 first outermost fibre bundle
1101 spar cap portion
1110 cavity
1250 additional portion
1302 fabric
1312 smaller rovings
1321 stitching
1335 first fabric thickness
1336 second fabric thickness
1351 first fabric edge
1352 second fabric edge
1381 first outermost roving
1382 second outermost roving
1400 spar cap and outer skin layers
1404 outer skin layers
1420 spar cap
$L_B$ length/longitudinal axis of blade

The invention claimed is:

1. A fibre reinforcement fabric (802) for a wind turbine component, the fibre reinforcement fabric (802) comprising a first plurality of fibre bundles (512, 812) arranged in parallel in a warp direction and stitched together, the fibre reinforcement fabric (802) having a first outermost fibre bundle (581, 881, 1381) defining a first fabric edge (851, 1051, 1351) parallel to the warp direction and a second outermost fibre bundle (1382) defining a second fabric edge (852, 1052, 1352) opposite the first fabric edge, the fibre reinforcement fabric (802) having a first tapered portion including the first outermost fibre bundle (581, 881, 1381), wherein a thickness of the fibre reinforcement fabric (802) in the first tapered portion tapers from a first fabric thickness (835, 1035, 1335) to a second fabric thickness (836, 1036, 1336) in a direction towards the first fabric edge (851, 1051, 1351), and wherein the fibre reinforcement fabric (802) is pliable and drapeable.

2. The fibre reinforcement fabric (1002, 1302) in accordance with claim 1, wherein the first plurality of fibre bundles comprises a second plurality of fibre bundles arranged in a first layer (401') and a third plurality of fibre bundles (402') arranged in a second layer on the first layer, wherein the second layer is terminated before the first fabric edge.

3. The fibre reinforcement fabric (802, 1002, 1302) in accordance with claim 1, wherein the first tapered portion comprises one or more fibre bundles having a first cross-sectional area and one or more fibre bundles having a second cross-sectional area smaller than the first cross-sectional area, arranged such as to provide the tapering of the thickness in the first tapered portion.

4. The fibre reinforcement fabric (802, 1002, 1302) in accordance with claim 3, wherein a ratio between the second cross-sectional area and the first cross-sectional area is at most 95%.

5. The fibre reinforcement fabric (1002, 1302) in accordance with claim 1, wherein the first plurality of fibre bundles is stitched together with one or more fibre bundles impregnated with resin.

6. The fibre reinforcement fabric (802, 1002, 1302) in accordance with claim 1, further having a second tapered portion including the second outermost fibre bundle (1382), a thickness of the fabric in the second tapered portion tapering from a third fabric thickness to a fourth fabric thickness in a direction towards the second fabric edge (852, 1052, 1352).

7. The fibre reinforcement fabric (802, 1002, 1302) in accordance with claim 6, wherein the fourth fabric thickness is equal to the second fabric thickness.

8. The fibre reinforcement fabric (802, 1002, 1302) in accordance with claim 6, wherein the tapering in the second tapered portion towards the second fabric edge is identical to the tapering in the first tapered section towards the first fabric edge.

9. The fibre reinforcement fabric (802, 1002, 1302) in accordance with claim 1, wherein the fabric has a reflectional symmetry seen in a direction along the warp direction.

10. The fibre reinforcement fabric (802, 1002, 1302) in accordance with claim 1, wherein the first plurality of fibre bundles comprises or consists of a plurality of glass fibre rovings.

11. The fibre reinforcement fabric (802, 1002, 1302) in accordance with claim 1, wherein the first plurality of fibre bundles comprises or consists of carbon fibre tows.

12. The fibre reinforcement fabric (802, 1002, 1302) in accordance with claim 10, wherein some or all of the first plurality of fibre bundles have a tex value in a range of 300-4800.

13. The fibre reinforcement fabric (802, 1002, 1302) in accordance with claim 1, wherein the fabric is stitched together at least via stitches going through one or more individual fibre bundles in the first plurality of fibre bundles.

14. The fibre reinforcement fabric (802, 1002, 1302) in accordance with claim 1, wherein the tapering towards the first edge occurs over a weft-wise distance of at least 2 mm.

15. A spar cap (1420) for a wind turbine blade, the spar cap comprising one or more of the fibre reinforcement fabrics (802, 1002, 1302) in accordance with claim 1.

16. A wind turbine blade comprising one or more of the fibre reinforcement fabrics (802, 1002, 1302) in accordance with claim 1 and/or the spar cap in accordance with claim 15.

17. A method of laying up fibre material in a mould for manufacturing a wind turbine blade shell part, comprising:

laying up fibre material (1404) to form an outer skin of the shell part; and laying up a plurality of fibre layers to form a spar cap fibre layup, the plurality of fibre layers comprising one or more of the fibre reinforcement fabrics (802, 1002, 1302) in accordance with claim 1.

18. The method in accordance with claim 17, further comprising arranging a vacuum bag on the mould and evacuating air from the laid-up material and infusing resin in between individual fibres in one or more of the first plurality of fibre bundles.

19. The method in accordance with claim 17, wherein an ambient temperature at the mould during laying up of the first plurality of fibre layers and/or a maximum temperature of the layup surface of the mould during laying up of the first plurality of fibre layers do not exceed 50 degrees Celsius.

20. The method in accordance with claim 17, wherein a maximum temperature of the layup surface of the mould during laying up of the first plurality of fibre layers does not exceed 50 degrees Celsius.

\* \* \* \* \*